(12) United States Patent
Hope (10) Patent No.: US 12,505,939 B2
(45) Date of Patent: Dec. 23, 2025

(54) PRESSURE BULKHEAD FOR ELECTRICAL CONDUCTORS

(71) Applicant: DarkVision Technologies Inc., North Vancouver (CA)

(72) Inventor: Jay Roderick Hope, Vancouver (CA)

(73) Assignee: DarkVision Technologies Inc., North Vancouver (CA)

( * ) Notice: Subject to any disclaimer, the term of this patent is extended or adjusted under 35 U.S.C. 154(b) by 226 days.

(21) Appl. No.: 18/201,215

(22) Filed: May 24, 2023

(65) Prior Publication Data

US 2024/0395443 A1 Nov. 28, 2024

(51) Int. Cl.
| | |
|---|---|
| *H01B 17/30* | (2006.01) |
| *E21B 47/017* | (2012.01) |
| *H01B 19/00* | (2006.01) |
| *H02G 3/22* | (2006.01) |
| *H02G 15/013* | (2006.01) |
| *H05K 5/06* | (2006.01) |

(52) U.S. Cl.
CPC ........... *H01B 17/306* (2013.01); *H01B 19/00* (2013.01); *H05K 5/069* (2013.01); *E21B 47/017* (2020.05)

(58) Field of Classification Search
CPC .............................. H02G 3/22; H02G 15/013
See application file for complete search history.

(56) References Cited

U.S. PATENT DOCUMENTS

| | | | | |
|---|---|---|---|---|
| 5,491,300 | A * | 2/1996 | Huppenthal | G06F 1/20 174/50.56 |
| 6,582,251 | B1 | 6/2003 | Burke | |
| 6,995,316 | B1 * | 2/2006 | Goto | H02G 15/013 174/152 G |
| 9,252,586 | B2 | 2/2016 | Pratley | |
| 9,758,114 | B1 * | 9/2017 | Volpone | B60R 16/0222 |
| 2020/0176151 | A1 | 6/2020 | Sprengers | |
| 2020/0312489 | A1 * | 10/2020 | Gronowicz, Jr. | H01B 13/0013 |

FOREIGN PATENT DOCUMENTS

| | | | |
|---|---|---|---|
| CN | 204559040 U | 8/2015 | |
| EP | 0499533 A2 * | 8/1992 | H02G 15/013 |

* cited by examiner

*Primary Examiner* — Timothy J Thompson
*Assistant Examiner* — Amol H Patel (57) ABSTRACT

A bulkhead system for passing conductors between a high-pressure side and a low-pressure side. The bulkhead may be used in harsh environments to pass signals or power to sensors and actuators on one side and to sensitive electronics on the other side. The conductors run through and are bonded at sides to a body, which body is supported in the direction of the pressure differential and not highly supported in other directions.

20 Claims, 9 Drawing Sheets

PRESSURE BULKHEAD FOR ELECTRICAL CONDUCTORS

FIELD OF THE INVENTION

The invention is directed to pressure bulkheads for passing electrical conductors, in particular conductors connected to sensor arrays operating in high pressure environments.

BACKGROUND OF THE INVENTION

In certain applications, electrical systems operate in harsh environments (e.g. high temperature, high pressure, and corrosive chemicals) and pass signals between regions of highly different pressures. There may be a need to measure the environment with sensors and it is desirable and often necessary to separate components of a system, such as electronics, from that harsh environment. In order to pass sensor signals and/or power from the harsh environment to an ambient one, a hermetically sealed bulkhead may be used.

The electrical conductors pass through the bulkhead, which seals around the conductors, while the bulkhead itself is sealed against some housing or mounting of the system to keep the internal electronics safe.

Figure 9:
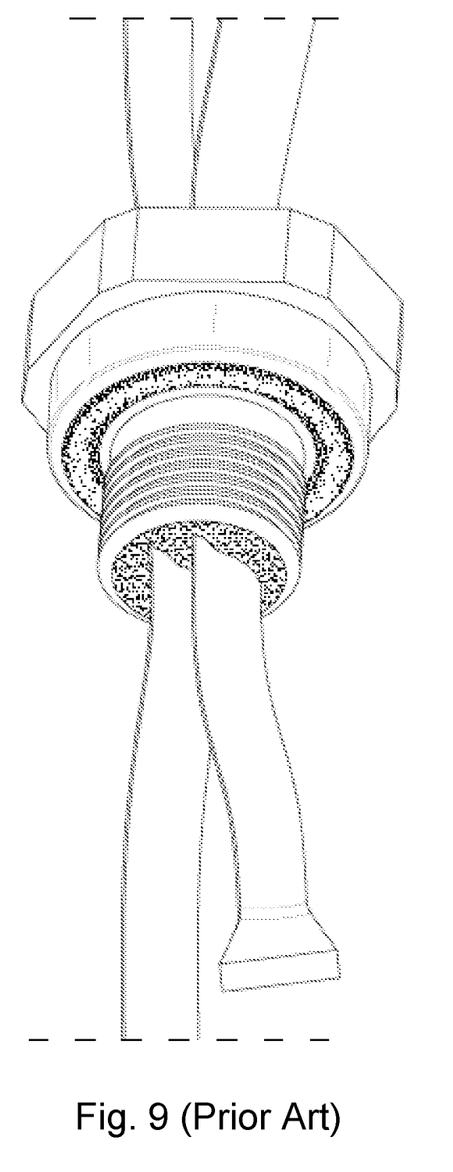
FIG. 9 is a perspective view of a high-pressure bulkhead according to a prior art design.

In known systems, exemplified by FIG. 9, epoxy is potted around several conductors to create a seal thereto. The epoxy is also potted within and sealed to a metal housing. The metal housing is then fixed by threads or bolts to some chamber to be isolated, with sealing means therebetween. Thus, two sealing surfaces are employed to ensure the isolation: the sides of the epoxy adhering to the housing and the housing sealed to the chamber using an O-ring. In high-pressure differential use, pressure applied to the top face of the epoxy body is resisted as a shear stress on the sides of the epoxy to metal interface. At some very high pressure, this will exceed the epoxy's bonding or shear strength.

The inventor has appreciated a way to hydrostatically load the bulkhead, while fully supporting the bulkhead, without inducing shear stress.

SUMMARY OF THE INVENTION

In one general aspect, a bulkhead includes a solid body having a first side and a second side, a plurality of conductors hermetically passing through the solid body, with ends of the plurality of conductors extending beyond the first and second sides of the solid body. A support substrate is formed to a) receive the solid body, b) contact the solid body on the first side, and c) pass the first of the ends of the conductors therethrough. A seal is located between the support substrate and the solid body, the seal surrounding the plurality of conductors passing through the support substrate.

Implementations may include one or more of the following features. The bulkhead may include a retainer directly or indirectly contacting the second side of the solid body and fixed to the support substrate. The bulkhead may include a biasing member between the retainer and the second side of the solid body to urge the first side of the solid body into contact with the seal. The solid body floats within a recess created between retainer and the support substrate, such that in operation, the solid body is hydrostatically loaded. The solid body may include epoxy, preferably epoxy having a tensile strength greater than 80 MPa, preferably where the epoxy has a glass transition temperature greater than 150 C. The support substrate has a recess that is wider than a width of the solid body to create a gap around the solid body. The solid body has a coefficient of thermal expansion substantially similar to or within 50% of a coefficient of thermal expansion of the support substrate. The solid body has a lap sheer strength greater than 17 MPa. The plurality of conductors may include a flex circuit, preferably having at least 50 conductors. The plurality of conductors has a circuit connector located at its first end and/or the plurality of conductors is connected to a sensor at its second end. The solid body is chemically bonded to the plurality of conductors to create a hermetic seal. The solid body is not bonded to the support substrate. The seal is located within a groove in the support substrate.

The seal contacts the solid body's first side. The first side opposes the second side. The support substrate is formed to conformably contact the solid body on the first side.

In one general aspect, a method of manufacturing a bulkhead includes providing a mold; inserting a plurality of conductors into the mold with a first end of the conductors passing through a hole in a bottom of the mold; flowing a settable material into the mold; allowing the settable material to set to form a solid body hermetically sealed to the conductors, with the first end and a second end of the plurality of conductors extending beyond opposing first and second sides of the solid body; inserting the solid body into a support substrate that is formed to a) receive the solid body, b) conformably contact the body on the first side, and c) pass one of the ends of the conductors therethrough; and locating a seal between the support substrate and the solid body's first side, the seal surrounding the plurality of conductors passing through the support substrate.

The method may provide mold release on interior surfaces of the mold prior to flowing the settable material. The material may be epoxy.

BRIEF DESCRIPTION OF THE DRAWINGS

Various objects, features and advantages of the invention will be apparent from the following description of embodiments of the invention, as illustrated in the accompanying drawings. The drawings are not necessarily to scale, emphasis instead being placed upon illustrating the principles of various embodiments of the invention.

DETAILED DESCRIPTION OF THE PREFERRED EMBODIMENTS

Figure 1:
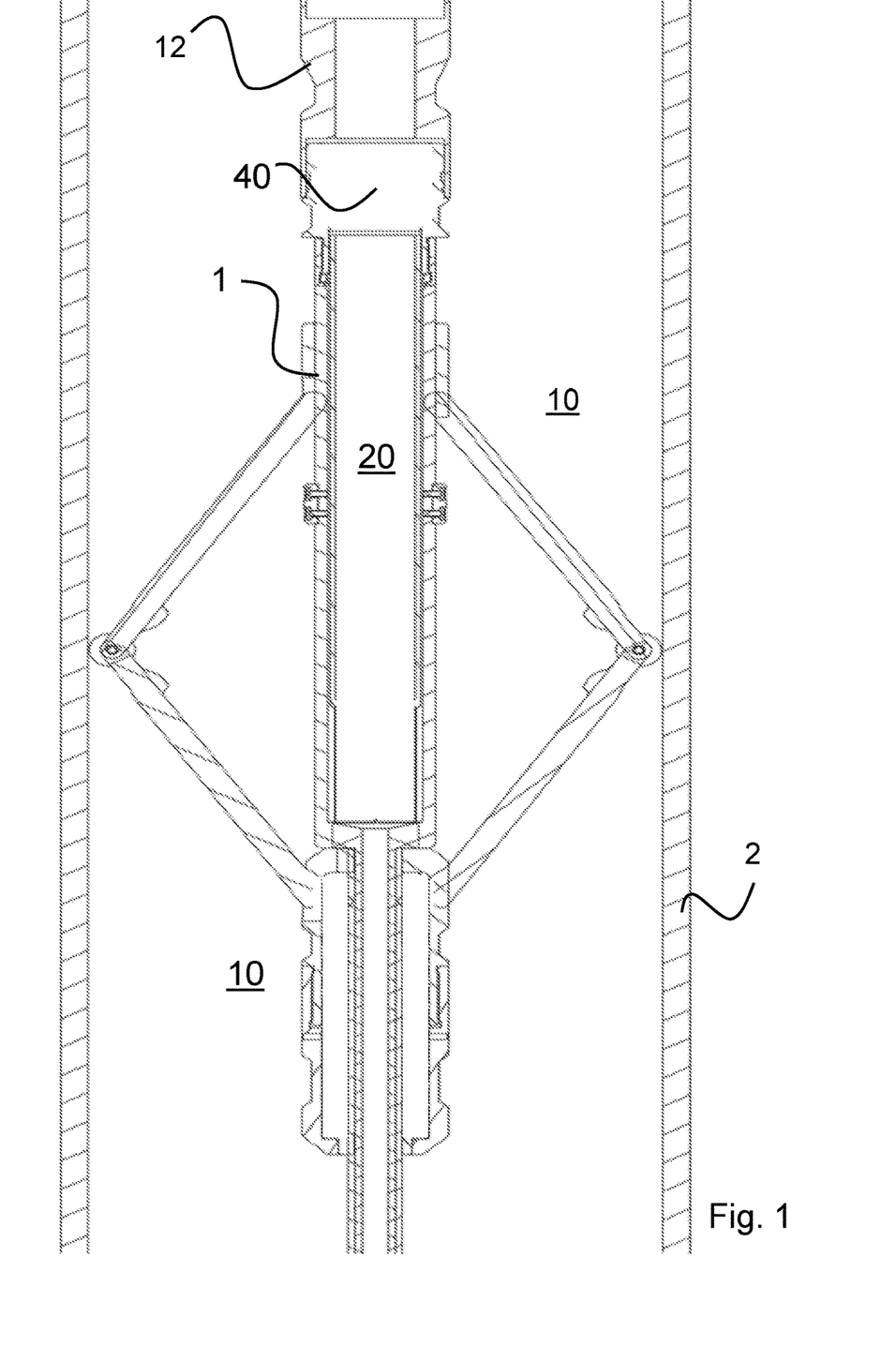
FIG. 1 is a cross-sectional of an imaging tool in an oil well.
Figure 2:
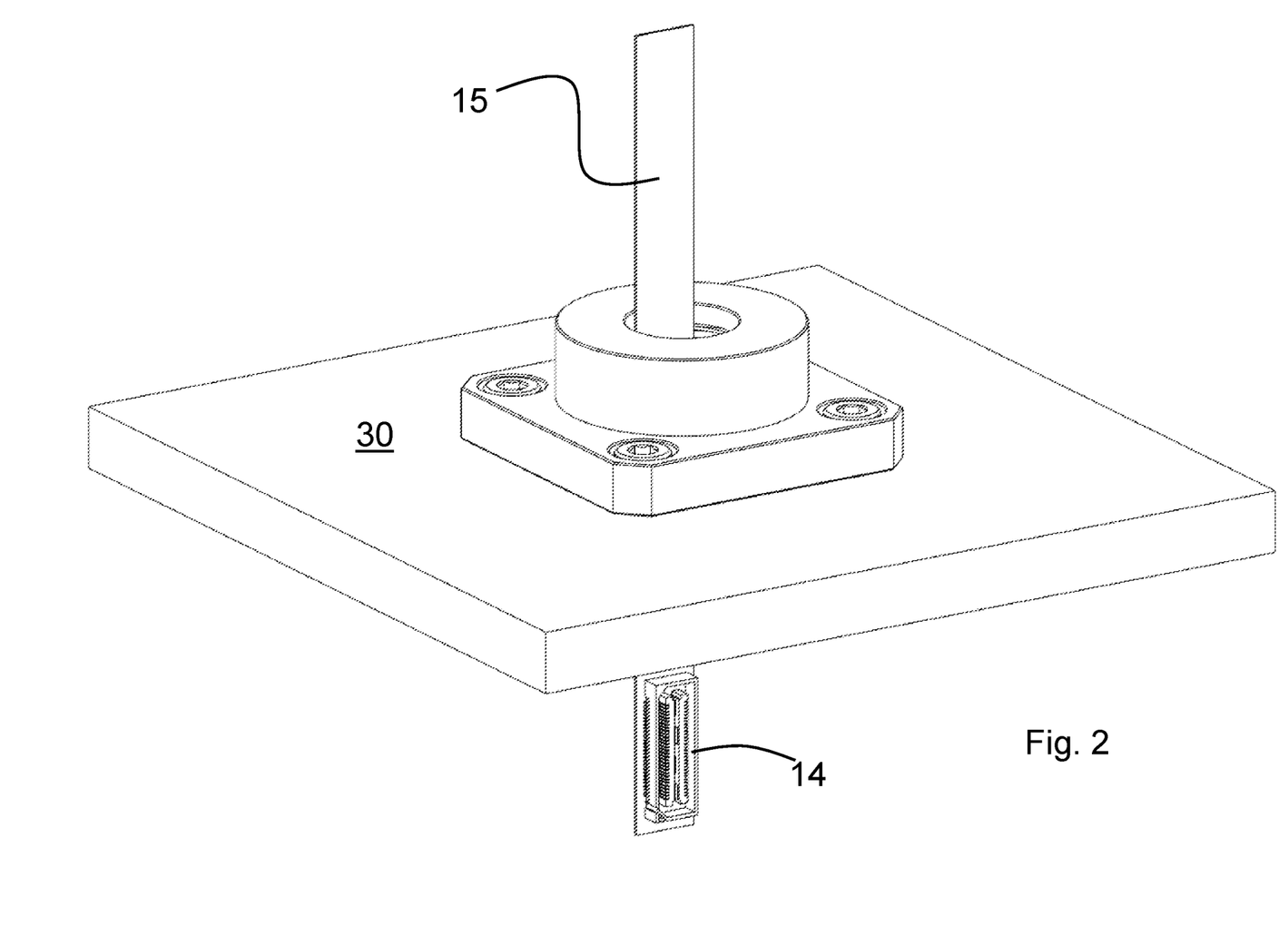
FIG. 2 is a perspective view of an assembled bulkhead.
Figure 3A:
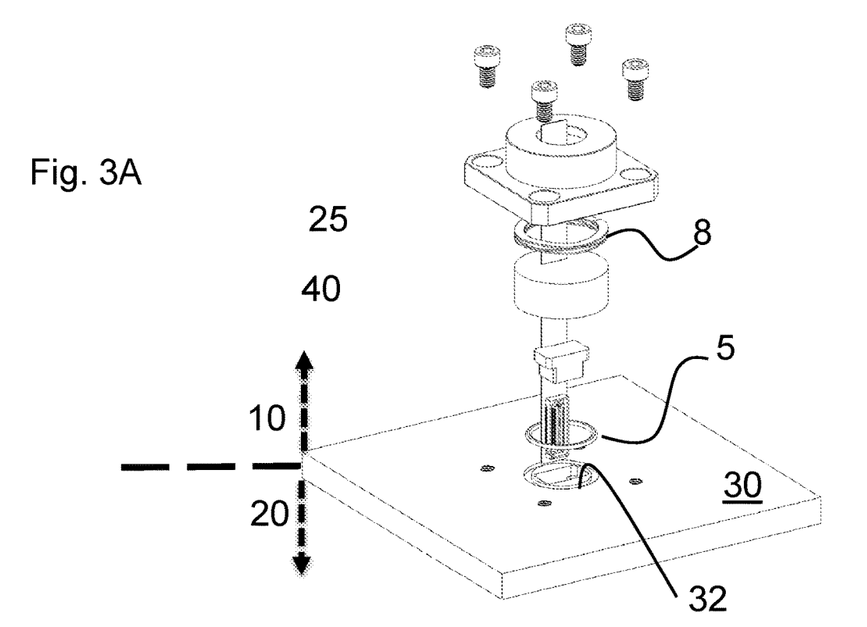
FIG. 3A is an exploded top view of a pressure bulkhead assembly.
Figure 3B:
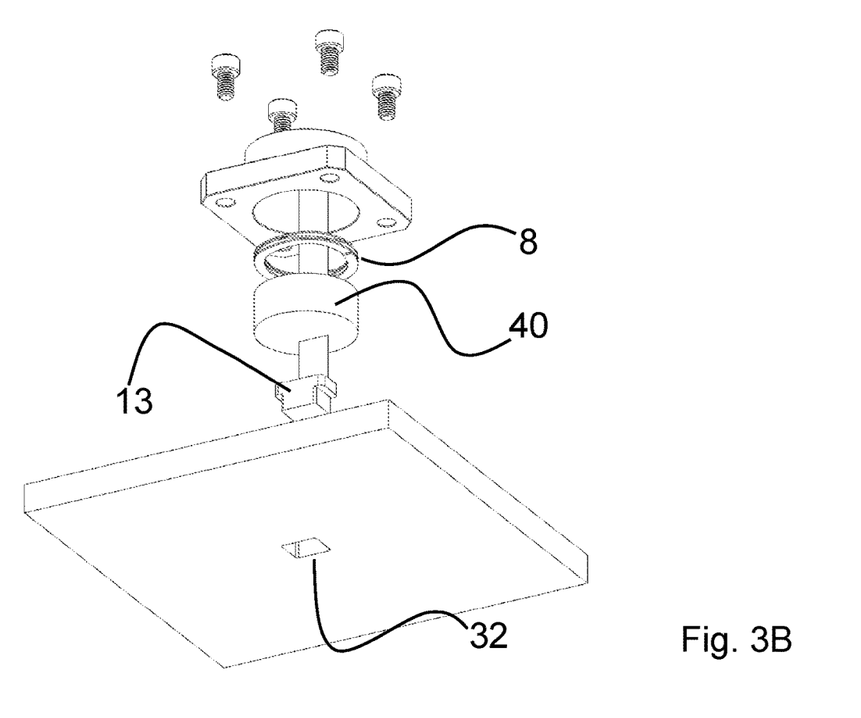
FIG. 3B is an exploded underside view of a pressure bulkhead assembly.
Figure 4:
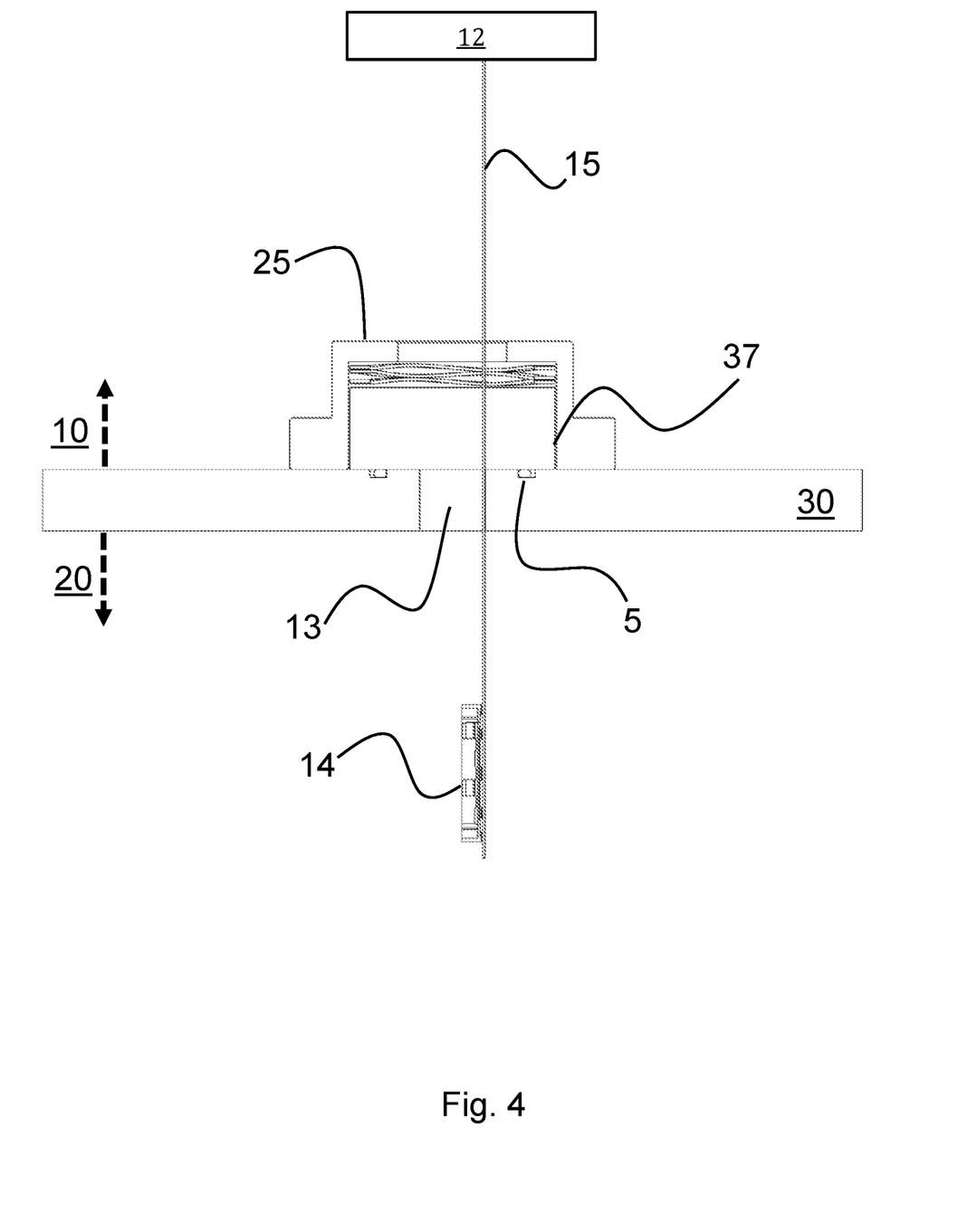
FIG. 4 is a cross-sectional view of a pressure bulkhead connected to a sensor.

With reference to the accompanying figures, a pressure bulkhead for cables/conductors 15 and method of manufacturing same are disclosed. As shown in FIG. 1, a pressure bulkhead comprising a solid body 40 separates high-pressure region 10 from low-pressure region 20 in a sensing device 1. As shown in FIGS. 3A and 3B, the bulkhead 40 is assembled into a recess 32 of housing 30 of the device that operates in a high-pressure corrosive environment 10. The purpose is to provide a fluidic seal for conductors 15 that may connect sensors 12 operating in the environment 10 to a circuit or circuit socket 14 located inside the instrument housing, which is at a lower pressure 20, as shown in FIG. 4. There may be 50 or more conductors. The conductors may carry power or signal. The conductors may connect to a sensor at one end and a circuit at the other end.

Figure 6:
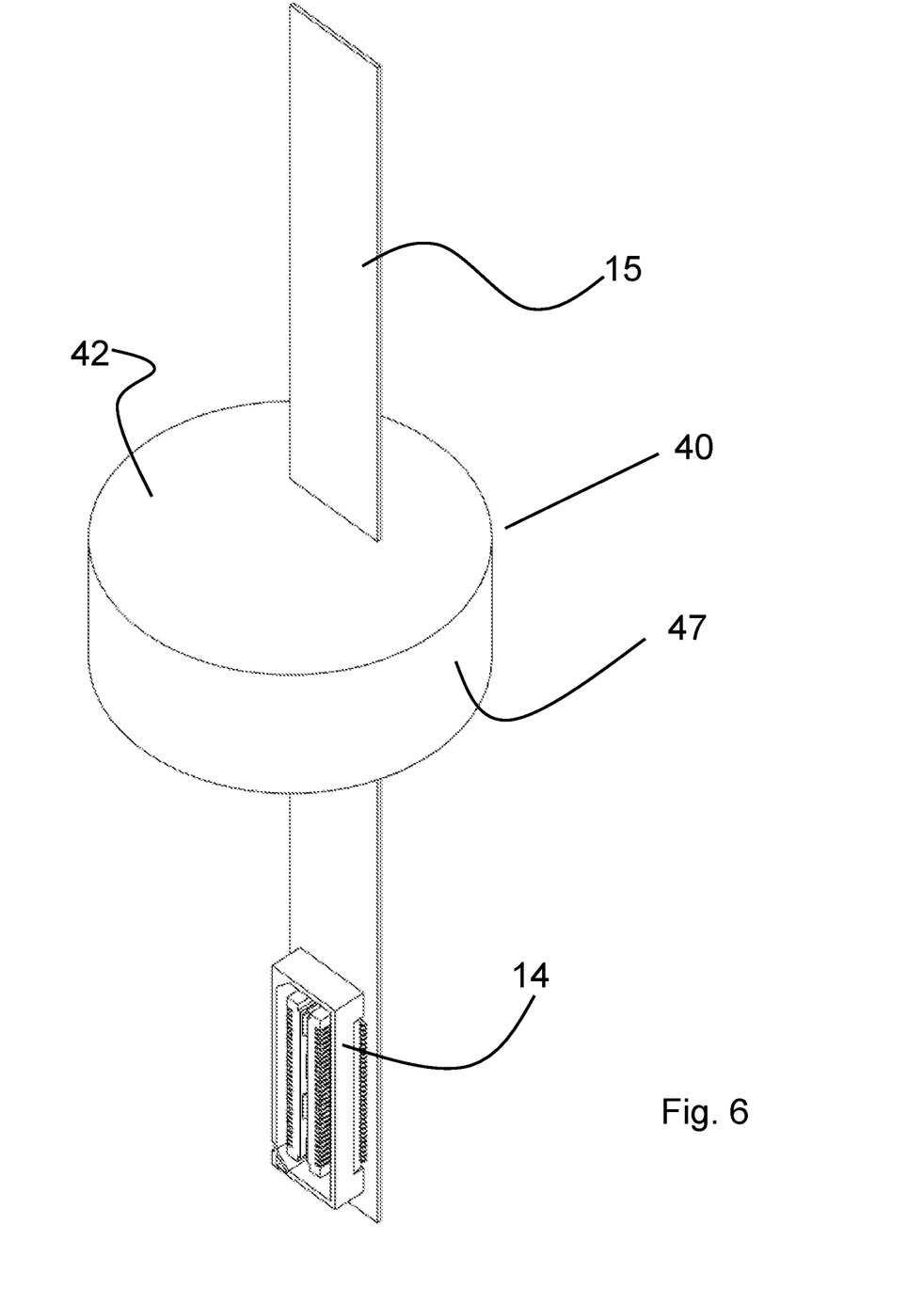
FIG. 6 is a perspective view of an unassembled bulkhead body.

In the details of FIG. 6, the body 40 has top side 42, and lateral sides 47. A bottom portion 13 of the body fits inside recess 32 (as shown in FIG. 3A) or retaining member 25 (as shown in FIG. 4) and is held in place by support sides 37 and removable bottom support surface 35. The conductors 15 adhere firmly to the body 40 and one of its ends passes through the housing 30 via the hole left when bottom support surface 35 is temporarily removed during assembly. Moving the bottom support surface 35 out of the way, permits the bulky circuit connector 14 to pass through during assembly. When the body 40 is held in place, there will be a small gap between the body sides 47 and support sides 37, which allows the body to expand and compress with temperature and pressure changes, without physically interfering with the surrounding sides, which would cause a residual shear strain.

The body 40 is physically supported by contact between the body's bottom face 45 and housing 30 with support surface 35. As seen in FIGS. 4 and 3A, fluidic face seal 5 is also created at this interface of body and support surface, e.g. by O-ring 5. The face seal is located in a groove in the housing, and the seal continuously surrounds the conductors, where they pass through the support surface. The groove helps locate the seal during assembly and provides a support structure for the seal as it deforms under pressure. There may be a retaining member 25 on top of the housing and body to keep the body within the recess and urged against this sealing means. The retaining member may be removable fixed to the housing 30, in order to service the connectors, sensors or circuit. A biasing member 8 provides resilient force to urge the body into contact with the support substrate.

Figure 8:
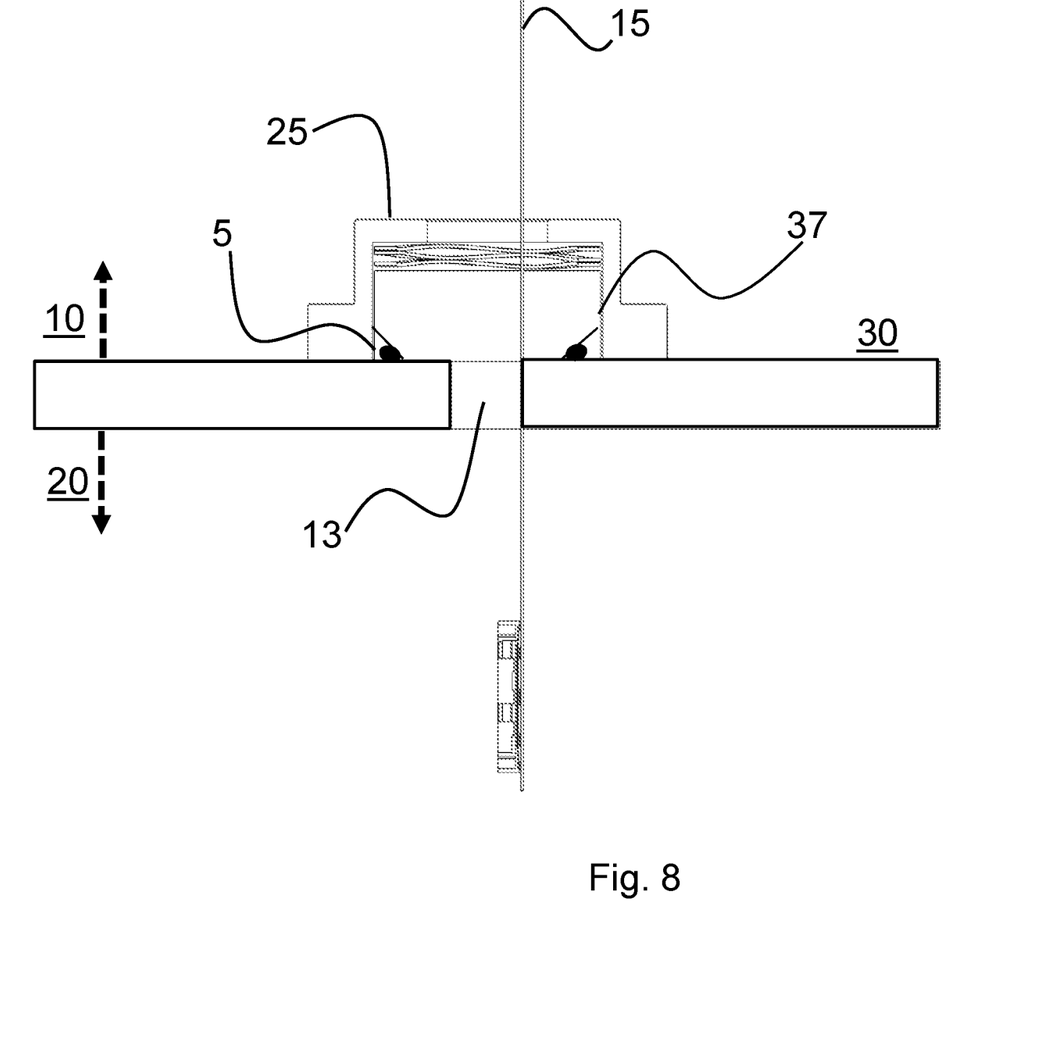
FIG. 8 is a cross-sectional view of a pressure bulkhead with crush seal.

In an alternate embodiment (shown in FIG. 8), a crush seal 5 is located between lateral sides of the body 40 and the support substrate's sides 37. In operation, the seal under pressure pushes into the chamfer of the body to create the sealing effect. The body remains hydrostatically loaded.

In operation, the high pressure 10 in the fluid acts upon the body's top side 42 and sides 47, which pressure is transferred to and supported by the bottom surface 35, which reinforces the sealing engagement. This creates a hydrostatic loading on the body, which is ideal for supporting very high pressures without creating shear, tension, or other unbalanced loads. There is no support from the recess' sides 37, and therefore no shear force is experienced to deform or damage the body 40. The body is not bonded to any metal housing, and so effectively floats within the support structure (32 and 25). As the pressure 10 increases, so does the support force and sealing quality, which is now only limited by the strength of the metal housing and compression strength of the body. In testing, the bulkhead was able to withstand pressures in environment 10 up to 140 MegaPascals (MPa), and is considered to have a working range of 80-140 Mpa, which is much higher than previously specified bulkheads.

The conductors may be bundled into many cables, preferably at least 50 insulated wires, of the type and format commonly used in industry. These may be flex cables, Ethernet, or other standard formats and may carry power and or electrical signals. After physical or chemical surface treatment, these cables are embedded in the epoxy during manufacturer to create a hermetic seal therebetween. The height of the body will determine the bonding strength to the conductors, but as there is no longitudinal force on the wires, the shear strain is minimal.

The instrument may be an industrial sensor that is inserted into high pressure corrosive environments to detect properties of the fluid and or surrounding casing, such as a pipeline or oilwell. The instrument is typically designed as a pressure vessel, having a metal housing 30 to withstand the pressure differential between the external and internal fluids. Creating a recess 32 in the wall of the housing, allows the pressure bulkhead to be assembled directly there on. Alternatively, an intermediary support structure may be used to receive the body and also sealingly engage with the housing. But that approach creates a need for an additional sealing surface.

In such tools, the sensors may include cameras, ultrasound, X ray, EMAT, calipers, pressure sensors, temperature sensors, speed of sound sensors, or magneto restrictive sensors. The cables 15 supply the power to the sensors and return the raw signals to a circuit board or connector 14.

FIG. 3A, 3B illustrates the pressure bulkhead in an exploded view. As shown, the O-ring 5 is placed into a groove in the recess 32, followed by the body 40, and retaining member 25. The retaining plate may be bolted to the housing. A biasing spring 8 is located between the retaining member and top surface 42 of the body to provide a pre-load, to maintain the body seated when there is no external pressure. Thus the retaining member holds the body in place by either directly or indirectly contacting the second side.

The body and support may cooperate with one or more locating pins in order to orient the body correctly during assembly and to prevent twisting during operation.

The skilled person will appreciate that the body need not be the cylinder shape shown in preferred embodiments and could take on many shapes that cooperate with a similarly shaped void in the recess or retaining member. The body could be a sphere and the support housing could have a curved recess conforming to the bottom of the sphere and a retainer having a curved recess conforming to the top of the sphere. This would give the body two extra degrees of rotational freedom to reposition the conductors, when not under load.

Figure 5A:
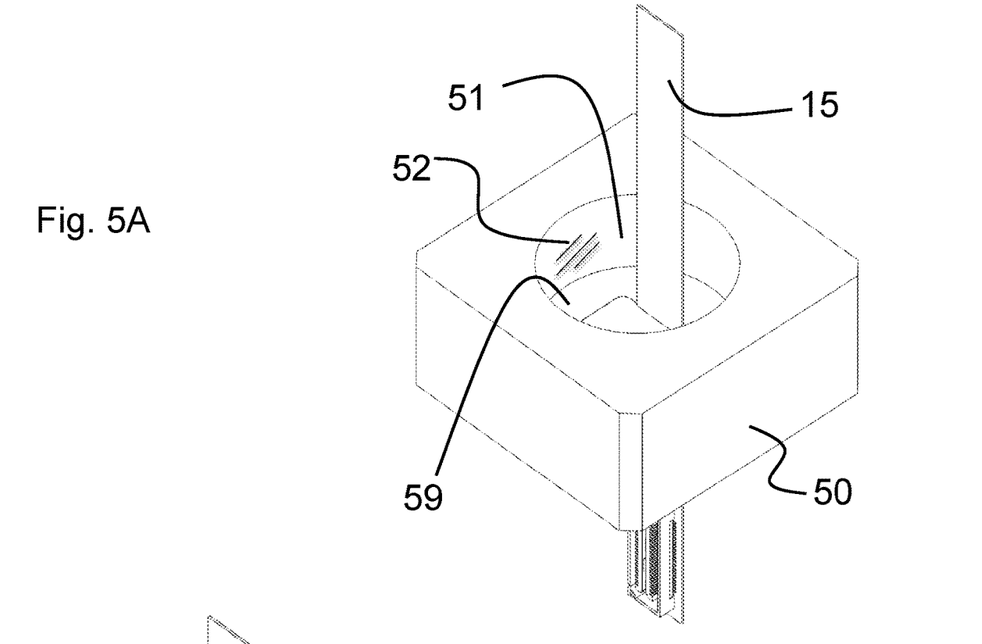
FIG. 5A is perspective view of a flex cable installed in a mold prior to adding epoxy.
Figure 5B:
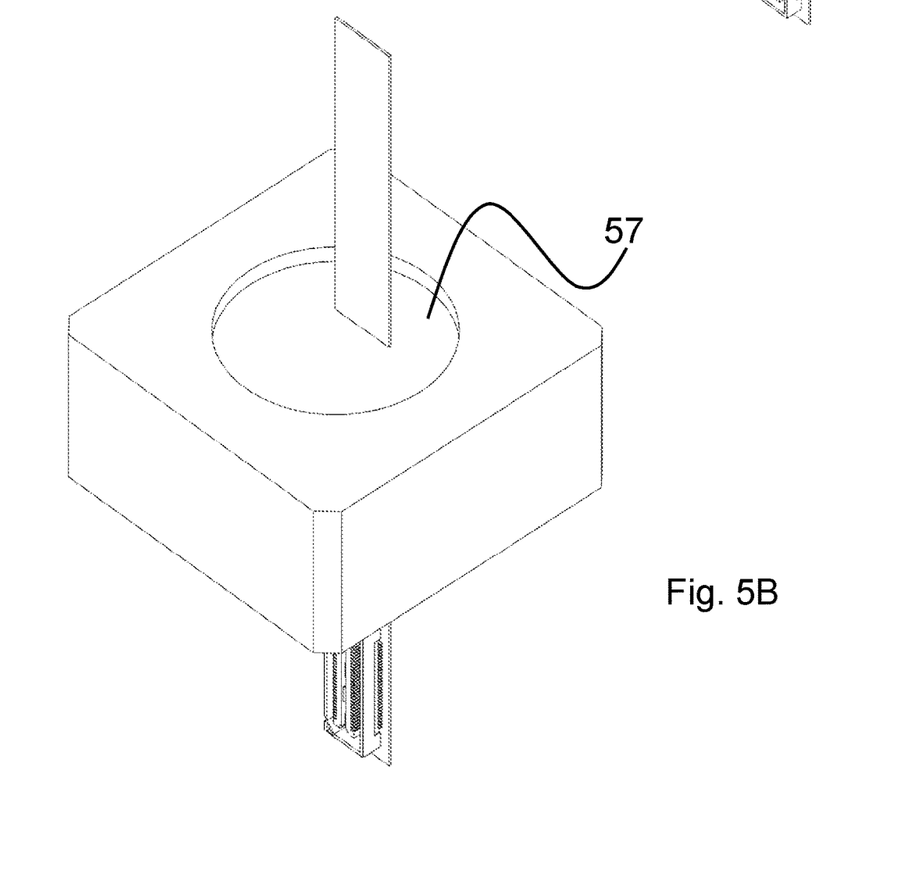
FIG. 5B is a perspective view of a mold with epoxy bulkhead curing around a flex cable.

FIG. 5A is a perspective view illustrating a method of manufacturing an epoxy body 40. A mold 50 of slightly smaller dimensions than recess 32 receives the conductors 15, which conductors' end passes through a hole in the bottom 59 of the mold. Uncured epoxy 57 is provided to the mold up to the level required and left to cure, as shown in FIG. 5B. This embeds the conductors within the body, with ends of the conductors extending past opposing faces of the body. A release agent 52 applied to interior mold sides 51 permits the body 40 to be removed when cured.

Epoxies are a preferred class of materials for forming the body and can be obtained with the appropriate properties for the intended installation (max temperature, max pressure, coefficients of expansion, chemical compatibility. However, other materials may be selected by the skilled material engineer for the intended installation, preferably materials that are flowable during molding, physically strong when set, chemically resistant, temperature resistant, high bonding strength to the type of conductors used. Thus PEEK (polyether ether ketone), glass, ceramics, epoxies, and plastics are good choices.

The epoxy may be one of several compounds used in industry that can withstand the temperatures and corrosive environment expected. The following are examples of properties that may be used to select an epoxy for a given application: A) the epoxy should have a bond strength strong enough to withstand the shearing stress exerted on the feedthrough by the external pressure; B) the epoxy should have a glass transition temperature above the operating temperature of the bulkhead, so that the epoxy does not flow into the low-pressure side 20 when pressurized; C) the epoxy should have a thermal expansion coefficient as close as possible to the retainer 25 and/or recess 32, preferably within 50%, in order to minimize the stresses induced in the epoxy; D) epoxy having a tensile strength greater than 12 ksi, preferably wherein the epoxy has a glass transition temperature greater than 150° C.; or E) the epoxy has a lap sheer strength greater than 17 MPa.

Figure 7:
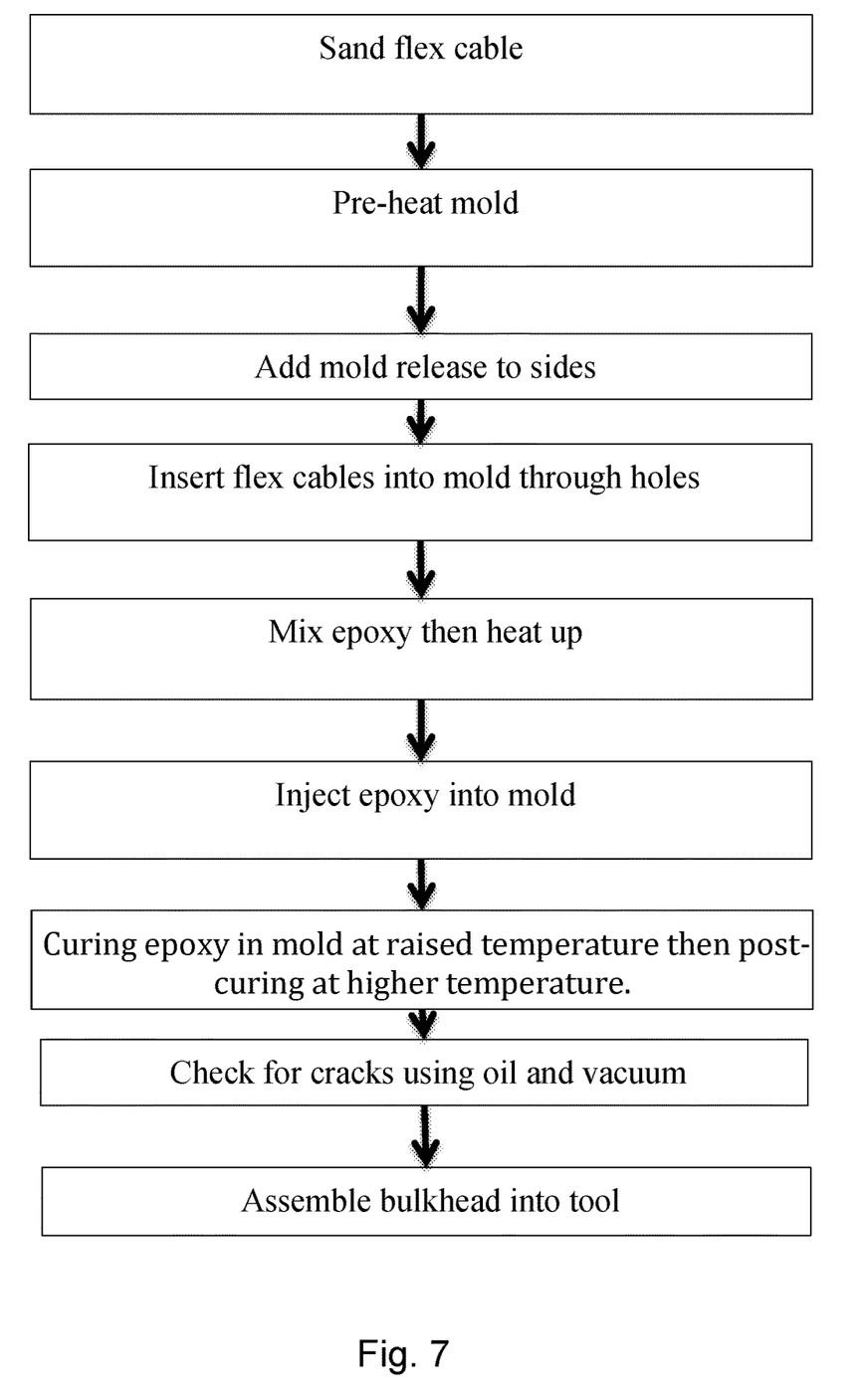
FIG. 7 is a flow chart for manufacturing a pressure bulkhead.

Examples of suitable epoxies include Masterbond EP15 which exhibits a tensile strength of 80 MPa, a thermal expansion coefficient of 22 ppm/° C., and an operating temperature up to 121° C.; and Aremco 2220 which has a flexural shear strength of 110 MPa, a thermal expansion coefficient of 32 ppm, and an operating temperature up to 204° C. Some epoxies are preferably cured at an elevated temperature and pressure. Degassing the epoxy under vacuum additionally ensures that there are no voids in the uncured epoxy added to the mold. The cured body may be tested for internal flaws and cracks by applying oil and vacuum. FIG. 7 provides a flow chart for making the bulkhead, as described above.

The invention claimed is:

1. A bulkhead operating between a high-pressure side and a low-pressure side comprising:
   a. a solid body having a first side and a second side;
   b. a plurality of conductors hermetically passing through the solid body, with ends of the plurality of conductors extending beyond the first and second sides of the solid body;
   c. a support substrate formed to a) receive the solid body, b) contact the solid body on the first side, and c) pass a first of the ends of the conductors therethrough;
   d. a seal located between the support substrate and the solid body, the seal surrounding the plurality of conductors passing through the support substrate; and
   e. a retainer directly or indirectly contacting the second side of the solid body and fixed to the support substrate.

2. The bulkhead of claim 1, further comprising a biasing member between the retainer and the second side of the solid body to urge the first side of the solid body into contact with the seal.

3. The bulkhead of claim 1, wherein the solid body comprises epoxy.

4. The bulkhead of claim 1, wherein the plurality of conductors comprises a flex circuit.

5. The bulkhead of claim 1, wherein the plurality of conductors has a circuit connector located at its first end and/or the plurality of conductors is connected to a sensor at its second end.

6. The bulkhead of claim 1, wherein the solid body is chemically bonded to the plurality of conductors to create a hermetic seal.

7. The bulkhead of claim 1, wherein the solid body floats within a recess created between the retainer and the support substrate, such that in operation, the solid body is hydrostatically loaded.

8. The bulkhead of claim 1, wherein the solid body is not bonded to the support substrate.

9. The bulkhead of claim 1, wherein the seal is located within a groove in the support substrate.

10. A method of creating the bulkhead of claim 1, comprising the steps:
    a. providing a mold;
    b. inserting the plurality of conductors into the mold with a first end of the conductors passing through a hole in a bottom of the mold;
    c. flowing a settable material into the mold;
    d. allowing the settable material to set to form the solid body hermetically sealed to the conductors, with the first end and a second end of the plurality of conductors extending beyond opposing first and second sides of the solid body;
    e. inserting the solid body into the support substrate that is formed to a) receive the solid body, b) contact the body on said first side, and c) pass one of the ends of the conductors therethrough; and
    f. locating the seal between the support substrate and the solid body's first side, and surrounding the plurality of conductors passing through the support substrate.

11. The method of claim 10, further comprising providing a retainer contacting the second side of the solid body and fixed to the support substrate.

12. The method of claim 11, further comprising locating a biasing member between the retainer and the second side of the solid body to urge the first side of the solid body into contact with the seal.

13. The method of claim 10, wherein the solid body comprises epoxy.

14. The method of claim 10, wherein the support substrate has a recess that is wider than a width of the solid body to create a gap around the solid body.

15. The method of claim 10, wherein the solid body is not bonded to the support substrate.

16. The bulkhead of claim 1, wherein the support substrate has a recess that is wider than a width of the solid body to create a gap around the solid body.

17. The bulkhead of claim 1, wherein the solid body has a coefficient of thermal expansion substantially similar to or within 50% of a coefficient of thermal expansion of the support substrate.

18. A bulkhead operating between a high-pressure side and a low-pressure side comprising:
    a. a solid body having a first side and a second side;
    b. a plurality of conductors hermetically passing through the solid body, with ends of the plurality of conductors extending beyond the first and second sides of the solid body;
    c. a support substrate formed to a) receive the solid body, b) contact the solid body on the first side, and c) pass a first of the ends of the conductors therethrough, wherein the support substrate has a recess that is wider than a width of the solid body to create a gap around the solid body; and
    d. a seal located between the support substrate and the solid body, the seal surrounding the plurality of conductors passing through the support substrate.

19. A bulkhead operating between a high-pressure side and a low-pressure side comprising:
    a. a solid body having a first side and a second side;

b. a plurality of conductors hermetically passing through the solid body, with ends of the plurality of conductors extending beyond the first and second sides of the solid body:
c. a support substrate formed to a) receive the solid body, b) contact the solid body on the first side, and c) pass a first of the ends of the conductors therethrough, wherein the solid body has a coefficient of thermal expansion substantially similar to or within 50% of a coefficient of thermal expansion of the support substrate; and
d. a seal located between the support substrate and the solid body, the seal surrounding the plurality of conductors passing through the support substrate.

20. The bulkhead of claim 19, wherein the support substrate has a recess that is wider than a width of the solid body to create a gap around the solid body.

\* \* \* \* \*